Figure 6:
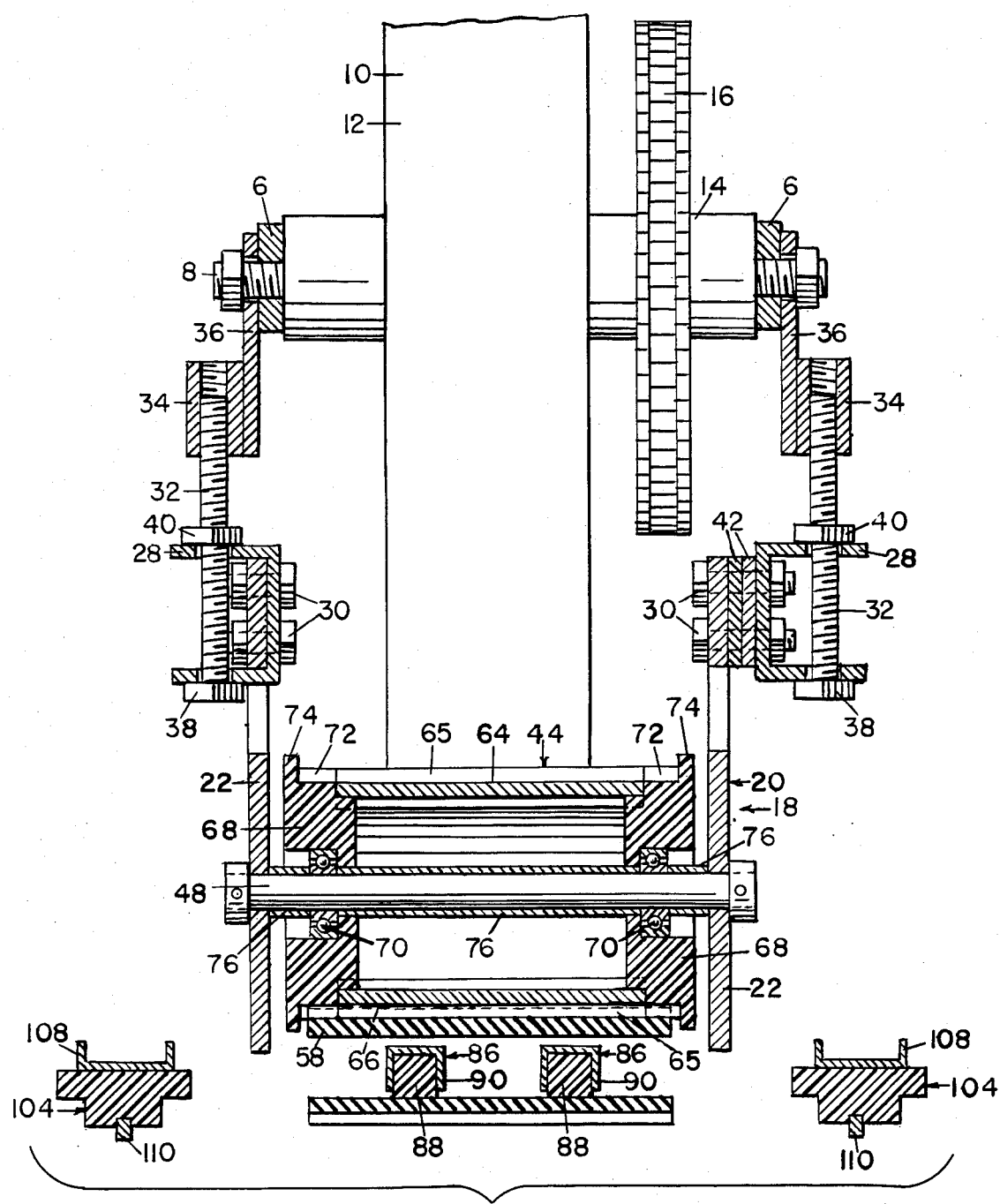

United States Patent [19]

Harris

[11] Patent Number: 4,488,616

[45] Date of Patent: Dec. 18, 1984

[54] SNOW TRACTION ATTACHMENT FOR MOTORCYCLES

[76] Inventor: Walter L. Harris, 9736 Reeder, Overland Park, Kans. 66214

[21] Appl. No.: 458,256

[22] Filed: Jan. 17, 1983

[51] Int. Cl.³ .......................................... B62M 27/02
[52] U.S. Cl. ...................................... 180/185; 305/20
[58] Field of Search ............ 180/185, 184, 191, 9.2 C; 305/20

[56] References Cited

U.S. PATENT DOCUMENTS

| 1,056,063 | 3/1913 | Schuh | 180/191 |
| 1,098,523 | 6/1914 | Oakes | 180/191 |
| 1,317,673 | 10/1919 | Ahlswede | 180/185 |
| 3,885,641 | 5/1975 | Harris | 180/185 |

FOREIGN PATENT DOCUMENTS 856558 6/1940 France ................. 180/185

Primary Examiner—John A. Pekar
Attorney, Agent, or Firm—John A. Hamilton

[57] ABSTRACT

A snow traction device for motorcycles or other vehicles consisting of a frame adapted to be supported from the axle of a power driven vehicle wheel, an endless flexible belt mounted about rollers carried by the frame and moving in an elongated loop extending forwardly and rearwardly beneath the wheel so that its lower reach may engage the snow, and a pair of rollers carried rotatably by the frame and snugly engaging both the vehicle wheel and the upper reach of the belt, whereby the former drives the latter to propel the vehicle. The frame mounting is adjustable to adapt it to fit operably relative to vehicle wheels of different diameters, and the froward end portion of the lower belt reach is angled upwardly to better attack the snow. A pair of skis are disposed respectively at opposite sides of the frame, parallel to the line of vehicle travel, and are urged resiliently downwardly relative to the frame. These skis support the vehicle against overturning when banked in a turn, and stabilize it against lateral slippage.

11 Claims, 6 Drawing Figures

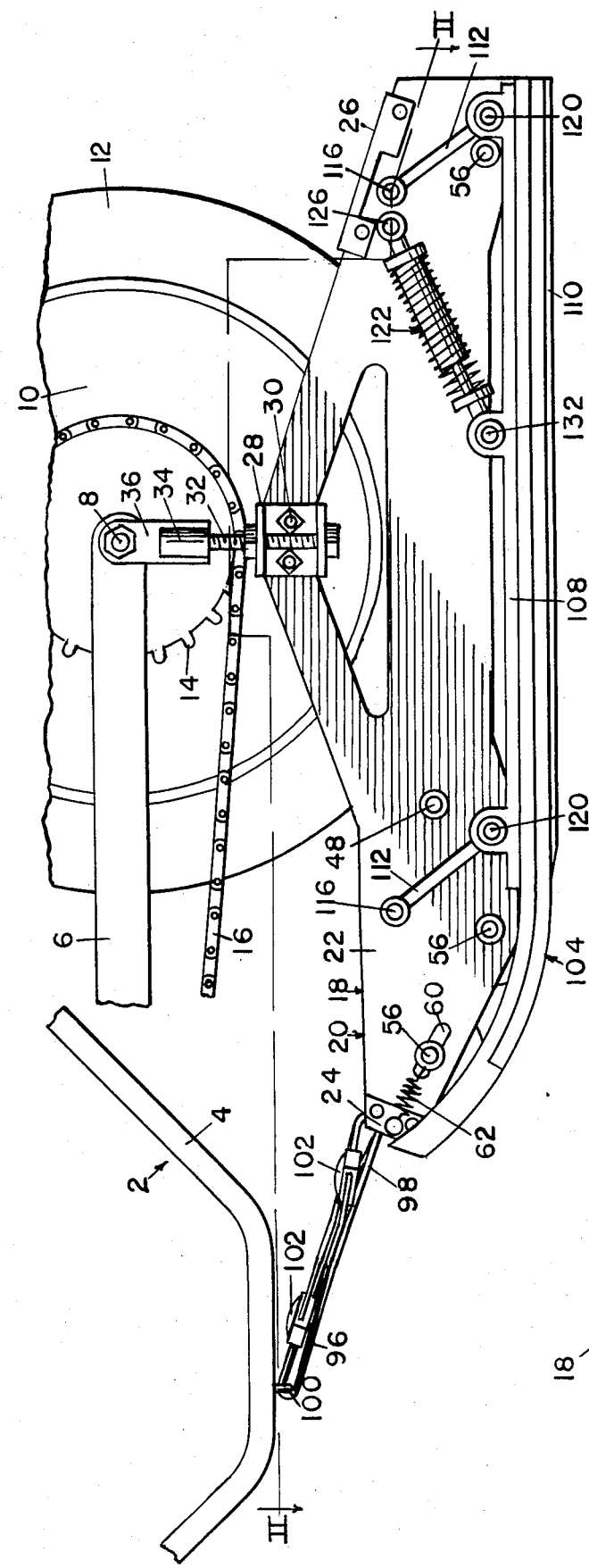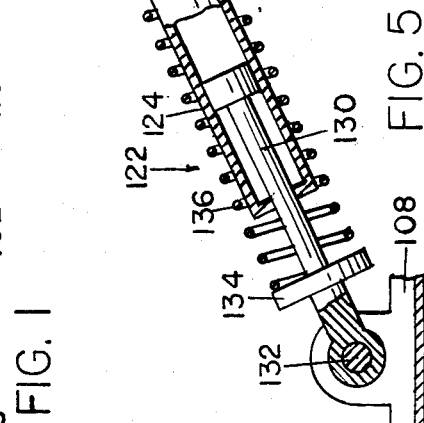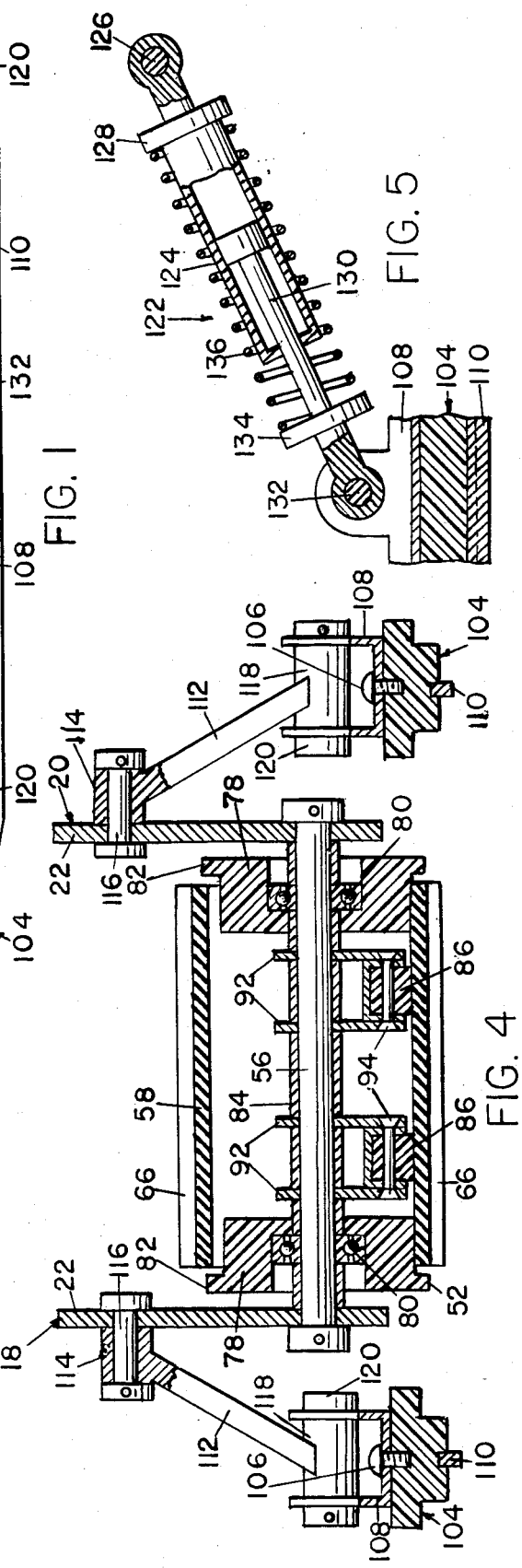

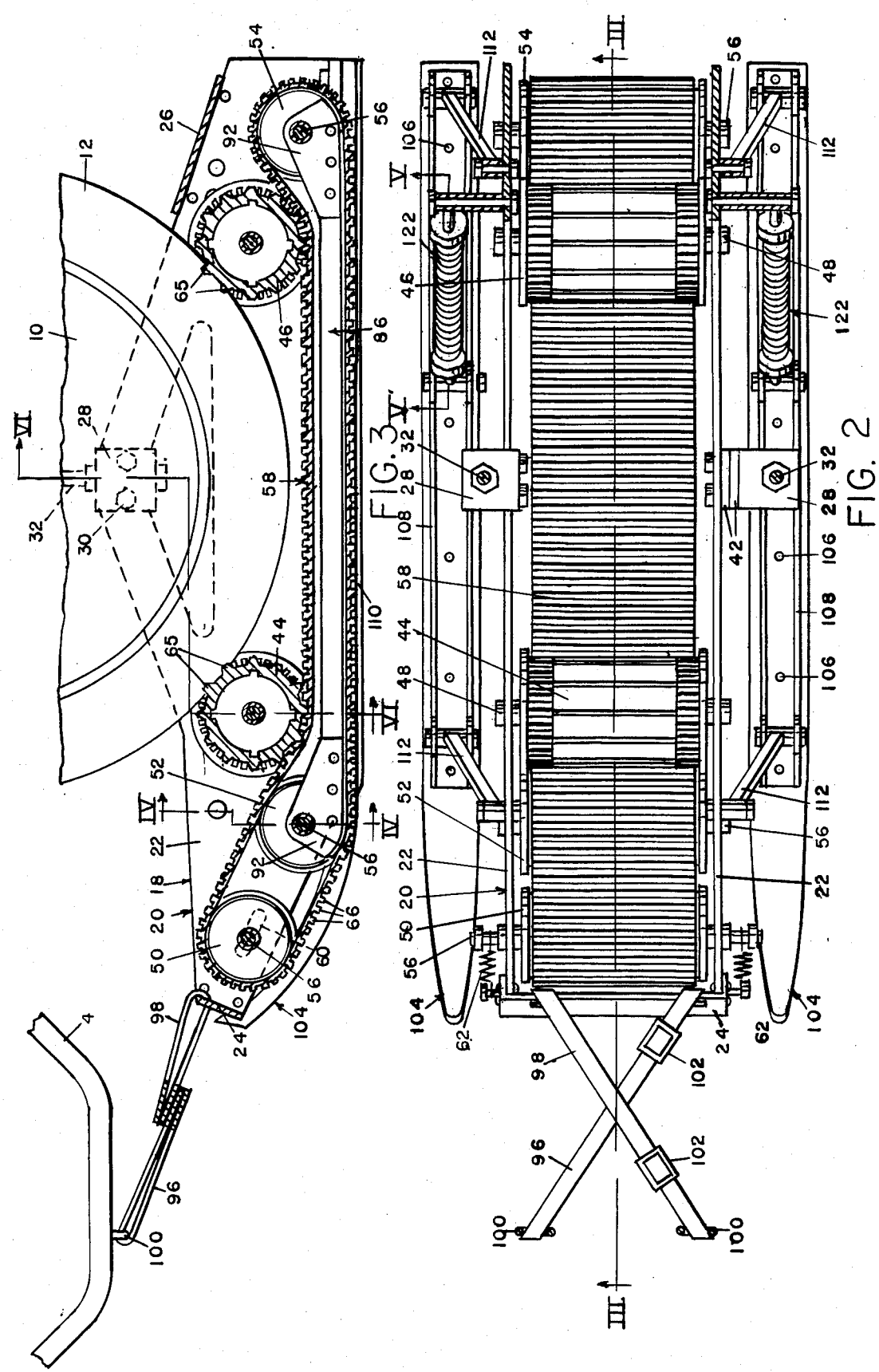

SNOW TRACTION ATTACHMENT FOR MOTORCYCLES

This invention relates to new and useful improvements in a device which may be attached to the powered ground-engaging wheel of a motorcycle or other vehicle to better adapt it for travel over snow-covered ground surfaces. It represents improvements over the device shown in my own prior U.S. Pat. No. 3,885,641, issued May 27, 1975.

While the prior device, in common with the present device, included a frame mountable on a wheel axle and an endless flexible belt carried by the frame in a loop extending beneath the wheel parallel to the line of travel with its lower reach against the snow, and a pair of drive rollers carried by the frame so as to engage and be driven by the vehicle wheel, and also engaging the upper belt reach to drive the belt in the same rotary direction as the wheel, nevertheless it was subject to certain shortcomings and inefficiencies of operation. It was not adapted to be mounted on vehicle drive wheels of different diameters. Due to torque exerted on the frame by the vehicle wheel, the track formed by the belt tended to ride in a nose-down position, thus tending to dig into the snow and impede forward travel. Difficulty was experienced in providing efficient driving traction between the drive rollers and the vehicle wheel. The prior device included a single broad ski, with the belt projecting downwardly through an aperture thereof. The ski of course tilted laterally with the vehicle, so that only one edge thereof engaged the snow, so that its load-supporting function was seriously impaired, and it had little effect in stabilizing the belt against lateral slippage on the snow.

The overcoming of the above enumerated problems associated with the prior device is the overall object of the present invention, in that the frame mounting of the present device is adjustable to accomodate vehicle wheels of different diameters, and for providing any desired traction pressure of the drive rollers against the wheel. Means are provided for preventing any lowering of the nose end of the belt loop, so that it cannot dig into the snow, while still permitting upward movement so as to better follow uneven snow contours. The belt contour has been altered so that the forward end of its lower reach slopes upwardly, thereby providing that it tends to "climb" out of deep snow. In place of a single ski, the present device utilizes a pair of separate skis at the respectively opposite sides of the belt, each loaded yieldably downwardly. Thus when the vehicle tilts laterally, one ski yields upwardly and the other downwardly, so that both remain in contact with the snow in order to better support vehicle weight, and to better stabilize the belt against lateral slippage on the snow.

Other objects are simplicity and economy of construction, and efficiency and dependability of operation.

With these objects in view, as well as other objects which may appear in the course of the specification, reference will be had to the accompanying drawing, wherein:

FIG. 1 is a fragmentary side elevational view of the rear wheel and associated parts of a motorcycle, showing a snow traction device embodying the present invention operatively mounted thereon, FIG. 2 is a sectional view taken on line II—II of FIG. 1 with the motorcycle wheel omitted, FIG. 3 is a sectional view taken on line III—III of FIG. 2, with parts left in elevation, FIG. 4 is an enlarged sectional view taken on line IV—IV of FIG. 3, with parts left in elevation, FIG. 5 is an enlarged, fragmentary sectional view taken on line V—V of FIG. 2, with parts left in elevation and partially broken away, and FIG. 6 is an enlarged, fragmentary sectional view taken on line VI—VI of FIG. 3 with parts left in elevation.

Like reference numerals apply to similar parts throughout the several views, and the numeral 2 applies generally to a motorcycle, although it will be understood that the traction device hereinafter described may be utilized in connection with other types of vehicles. The motorcycle has a main frame 4 including a pair of rearwardly extending, spaced apart fork arms 6 with the rear axle 8 of the cycle extending transversely between and mounted in the rearward ends thereof. The rear ground-engaging wheel 10 of the cycle is rotatably mounted on axle 8, and customarily includes an inflatable tire 12. Also mounted on axle 8, and rotatable with wheel 10, is a sprocket wheel 14 meshed with a sprocket chain 16 driven by the power plant of the cycle to propel said cycle forwardly, or to the left as viewed in FIG. 1, in a manner well known in the art and not here shown.

The traction attachment forming the subject matter of the present invention is designated generally by the numeral 18, and includes a frame 20 comprising a pair of vertically disposed side plates 22. Said side plates are elongated forwardly and rearwardly, are disposed respectively at opposite sides of vehicle wheel 10, and are connected forwardly of said wheel by a transversely extending plate 24, and rearwardly of said wheel by a transversely extending plate 26, plates 24 and 26 being riveted or otherwise affixed to said side plates.

Side plates 22 do not rise as high as wheel axle 8, but directly beneath said axle, a bracket 28 is afffixed to the top of each side plate, as by bolts 30, and a normally vertical screw 32 is carried rotatably in said bracket and extends upwardly therefrom, being threaded at its upper end into an elongated nut 34 affixed to the lower end of an arm 36 which is pivoted at its upper end on axle 8. As best shown in FIG. 6, the head 38 of each screw 32 is disposed beneath the bracket, and a lock nut 40 threaded on the screw abuts the top of the bracket. Thus frame 20 may be adjusted vertically relative to axle 8 by turning screws 32 and the adjustment fixed by tightening lock nuts 40, for a purpose which will presently appear. The lateral spacing between the two screws 32 may be adjusted by inserting shim plates 42 as required between either bracket 32 and its associated side plate 22, also as indicated in FIG. 6. Outward spacing of the screw 32 at the side of wheel 10 at which sprocket wheel 14 is disposed is generally required, in order that wheel 10 will be disposed laterally midway between side plates 22, and laterally centered relative to the traction belt carried in frame 20, as will appear.

A pair of drive rollers 44 and 46 are disposed between side plates 22, respectively forwardly and rearwardly of mounting screws 32. Each of said drive rollers is mounted rotatably on a horizontal shaft 48 extending laterally between and secured in side plates 22. They are spaced apart forwardly and rearwardly by a distance less than the diameter of vehicle wheel 10, so that said wheel rests between and in contact with both of them, as best shown in FIG. 3. Also disposed between side plates 22 are a series of belt pulleys 50, 52 and 54, each mounted rotatably on a shaft 56 extending laterally between and mounted in side plates 22. Pulleys 52 and 54 are disposed respectively just forwardly of front drive roller 44 and just rearwardly of rear drive roller 46, at a level below that of said drive rollers, but only by a distance less than the diameter of the roller. Pulley 50 is disposed forwardly of pulley 52, but at a higher elevation. An endless traction belt 58, formed of natural or synthetic rubber or other suitably tough and flexible material is trained about pulley 50, 52 and 54, as shown in FIG. 3. The upper belt reach passes below drive rollers 44 and 46, and pulley 52 is disposed between the upper and lower belt reaches. The shaft 56 of front pulley 50 extends outwardly through slots 60 of side plates 22 which are elongated in the direction of belt travel, and are biased forwardly by springs 62 to maintain the belt under substantial tension at all times. The outer surface of the belt is provided with transversely extending ribs 66, to provide efficient traction with a snow surface.

As best shown in FIG. 6, each of drive rollers 44 and 46 comprises a generally cylindrical body member 64, preferably formed of metal and ribbed parallel to its axis, as indicated at 65, to provide efficient, non-slip traction with vehicle wheel 10, and a pair of end discs 68, which may be formed of a synthetic polymer, fitted non-rotatably into the respectively opposite ends of the cylindrical body, and journalled on shaft 48 by ball-bearings 70. The periphery of each end disc has gear teeth 72 formed therein, which mesh with the ribs 66 of belt 58 at the side edges of said belt, in order to drive said belt. At the outer end of the gear teeth, the disc is provided with a peripheral flange 74 for maintaining the belt laterally centered on the rollers. The entire roller is maintained centered between side plates 22 by spacers 76 carried on shaft 48. As best shown in FIG. 4, each of belt pulleys 50, 52 and 54 has no body member corresponding to body 64 of the drive rollers, but consists merely of a pair of end discs 78 engaged respectively in the opposite edge portions of belt 58 and journalled on shaft 56 by ball bearings 80, with the belt being maintained laterally thereon by flanges 82 of the end discs, and the entire pulley being centered between side plates 22 by spacers 84 on shaft 56.

The lower reach of belt 58 between belt pulleys 52 and 54, which normally supports the vehicle weight supported by wheel 10, is prevented from yielding upwardly by a pair of narrow, elongated skids 86 extending between shafts 56 of these pulleys, parallel to this belt reach and spaced apart between the lateral edges of the belt. As best shown in FIG. 6, each of said skids comprises an elongated skid core 88 consisting of a rectangular length of a synthetic polymer, the lower surface of which is in direct engagement with the inner surface of the lower belt reach, encased except for its lower edge portion in a downwardly opening metal channel 90. As best shown in FIGS. 3 and 4, each end of each skid is provided with a pair of side plates 92, affixed thereto by rivets 94 and perforated, above the skids, to receive the associated pulley shaft 56, whereby the skids are securely mounted. Spacers 84 of shafts 56 also maintain the lateral spacing and positioning of the skids. Certain types of polymers are readily available which are extremely well suited for use in the skid cores, in that they are extremely tough and wear resistant, and also have a self-lubricating function against the belt. The forward transverse plate 24 of attachment frame 20 is connected to a rigid portion of motorcycle main frame 4 by a pair of flexible but strong straps 96 and 98 which extend forwardly and upwardly to suitable attachments 100 on the cycle frame. Preferably, the belts are crossed, as indicated in FIG. 2, and are tightened, each by means of its buckle 102, sufficiently to restrain frame 20 against any downward movement of its forward end from a normal riding position, i.e. with the lower reach of belt 58 horizontal, but to permit upward movement.

A pair of skis 104, each relatively narrow as compared to belt 58, are disposed respectively in outwardly spaced relation from each of the side walls 22 of frame 20, being parallel to the belt, extending generally the full length of frame 20, and being curved upwardly at their forward ends. They may be formed also of a synthetic polymer for light weight, and each is reinforced along the straight portion of its length by a metal channel 108 secured to its upper surface by screws 106. The forward curved portions of the skis may be similarly reinforced. Each ski should be sufficiently broad to support substantial weight on underlying snow. A narrow metal strip 110 extends along the full length of the straight portion of each ski, being embedded in and projecting below the bottom surface of the ski. These metal strips constitute "blades" which greatly increase the resistance of the ski to lateral slippage in snow.

Each ski 104 is supported from the adjacent frame side wall 22 by a pair of crank arms 112 respectively adjacent the opposite ends of the straight portion of the ski. As best shown in FIGS. 1 and 4, each crank arm 112 is provided at its upper end with a sleeve 114 journalled on a horizontal transverse pin 116 fixed in the adjacent side wall 22, then slopes outwardly, downwardly and rearwardly, and is provided at its lower end with a seeve 118 journalled on a horizontal transverse pin 120 extending between the flanges of ski reinforcing channel 108. Each ski is biased resiliently downwardly, as permitted by turning of crank arms 112, by a spring-loaded extensible strut 122. As shown in FIG. 2, each strut 122 is disposed in the vertical plane of its associated ski, and as best shown in FIGS. 1 and 5, each strut comprises a hollow cylinder member 124 pivoted at its upper end on a horizontal transverse pin 126 fixed in the adjacent side wall 22, and having a peripheral flange 128 adjacent its upper end, a piston member 130 slidable in cylinder 124 and projecting from the lower end thereof for pivotal engagement on a horizontal transverse pin 132 extending between the flanges of ski reinforcing channel 108, and having a peripheral flange 134 adjacent its lower end, and a compression spring 136 surrounding cylinder 124 and interposed between flanges 128 and 134, whereby to bias the ski yieldably downwardly. The struts are capable of allowing each ski to either rise above or fall below the plane of the lower reach of belt 58, within limits established by the degree of extensibility of said struts.

In operation, it will be apparent that with the traction attachment 18 mounted on motorcycle 2 as shown, rotation of cycle wheel 10 by the motorcycle engine, not shown, will cause said wheel to turn drive rollers 44 and 46, against which said wheel is tightly pressed, both by the weight of the cycle and the tension of mounting screws 32, and that rotation of the drive rollers will drive belt 58, by virtue of the meshing of gear teeth 72 with the belt ribs 66, to turn in the same rotary direction as wheel 10, and that the resulting rearward movement of the lower reach of the belt will drive the vehicle forwardly. Of course, the lowermost point of wheel 10 must be spaced above the upper belt reach at all times, as indicated in FIG. 3, since at that point they are moving in opposite directions.

The adjustability of the effective lengths of screws 32 on which mount frame 20 on wheel axle 8, by turning them into or out of their elongated nuts 34, serves to adjust the traction device for use on vehicles having wheels 10 of different diameters, being capable, as shown, of adapting it for use on wheels of the most commonly used diameters. It also serves for drawing the drive rollers more tightly against wheel 10, in order to insure a non-slipping traction connection therebetween at all times, even when belt 58 may arise above the ground. Actually, the maintenance of a good traction between the wheel 10 and the drive rollers may be insured simply by shortening screws 32, so that the main concern is a roller surface which will not cut or damage tire 12 of the wheel. This is accomplished by the use of the relatively blunt, widely spaced ribs 65 of the roller body 64. However, good traction between the drive rollers and belt has other problems, in that the belt is necessarily formed of a relatively soft material and is not well supported where it contacts the drive rollers. In the present structure, therefore, the teeth of the gear portions 72 of the drive rollers are much more closely spaced than are body ribs 65, and the tops of belt pulleys 52 and 54 are offset above the bottoms of the drive rollers, so that the belt is caused to "wrap around" the drive rollers to a considerable angular extent. This creates many more points of driving contact of the drive rollers against the belt.

It will be apparent that the rotation of the vehicle wheel exerts a strong torque on attachment frame 20, tending to rotate it in a counterclockwise direction about its pivotal connection to axle 8, as viewed in FIGS. 1 and 3. While the engagement of the belt with the snow may prevent actual rotation, there would still be a strong tendency for the frame to ride in a nose-down position, causing the belt to tend to dig deeper into the snow. This impedes forward progress, and represents wasted power. Straps 96 and 98 positively prevent the assumption of any nose-down attitude of the frame, being set in length to prevent any lowering of the forward end of the frame beyond a level position, while still permitting upward movement in the event it moves into an upslope of a snow surface, to prevent it from digging into said slope. The crossing of these straps, as indicated in FIG. 2, provides that one or the other of them will be placed in direct tension in the event the forward end of the frame is forced to one side or the other. They thus act as a stabilizer against lateral displacement of the forward end of the frame, to insure that belt 58 remains accurately in the line of vehicle travel. The use of forward belt pulley 50, disposed higher than pulley 52, provides that the lower reach of belt 58 is always inclined upwardly and forwardly. This inclined portion of the belt compresses the snow ahead of pulley 52 relatively gradually, easing forward travel and reducing the power requirements.

Both of skis 104 rest on the snow substantially at all times, being biased downwardly by springs 136 of struts 122. They thus support some of the weight of the vehicle and produce a smoother, more "gliding" ride. However, they must not support so much of the vehicle weight as to seriously reduce the pressure of the lower reach of belt 58 against the snow. This would tend to lift the belt away from the snow, and seriously impair its propelling effect. The springs 136 are sufficiently weak to prevent this occurrence. The chief function of the skis, however, is to stabilize belt 58 against lateral slippage on the snow when the vehicle is negotiating a turn, when such slippage can of course occur very easily on a snow surface. The skis themselves resist lateral slippage much more strongly than the belt, which has transverse traction ribs 66, and the effect is greatly enhanced by the bottom longitudinal "blades" 110 of the skis, which bight easily into hard packed snow or even ice. When the vehicle negotiates a turn, it "leans" in the direction of the turn. The ski at the inside of the turn is retracted above the level of belt 58 by yielding of its spring 136, but remains against the snow. The ski at the outside of the turn is extended below the plane of belt 58 by expansion of its spring 136, and also remains against the snow. Thus, in all normal circumstances, the lateral stabilizing effect of both skis remains operable at all times.

The forward wheel of motorcycle 2, not shown, may also require snow support, but this is not pertinent to the present invention. Said forward wheel is normally not powered, and hence requires no traction belt comparable to belt 58. Neither need it necessarily rotate. Therefore snow support therefor may be provided by a single ski securely strapped to its rim.

While I have shown and described a specific embodiment of my invention, it will be readily apparent that many minor changes of structure and operation could be made without departing from the spirit of the invention.

What I claim as new and desire to protect by Letters Patent is:

1. For use in connection with a vehicle having a powered ground-engaging wheel equipped with a rubber tire, a snow traction attachment comprising:
   a. an attachment frame,
   b. an endless flexible traction belt carried on suitable belt pulleys rotatably mounted in said frame to form a generally horizontal loop,
   c. a pair of drive rollers carried rotatably in said frame and having driving engagement with said belt,
   d. means operable to attach said frame to the frame of said vehicle whereby said drive rollers and said belt are disposed beneath said vehicle wheel with the lower reach of said belt positioned to engage a snow surface beneath said wheel and extending forwardly and rearwardly in the direction of vehicle travel, and with said wheel having driving engagement with said drive rollers but not with the upper reach of said belt, whereby said vehicle wheel, acting through said drive rollers, turns said belt in the same rotary direction as said wheel to propel said vehicle over the snow, and
   e. means operable to adjust said means for attaching said attachment frame to said vehicle to vary the vertical elevation of said frame relative to said vehicle, whereby said drive rollers may both be pressed against the rubber tire of said vehicle wheel for optimum drive pressure, and also adapted to engage vehicle wheels of different diameters, said adjusting means comprising a pair of generally vertical screws secured rotatably to said attachment frame at respectively opposite sides of said vehicle wheel, and a pair of generally vertical nuts each secured non-rotatably at its upper end to said vehicle frame at the axle of said vehicle wheel, each of said nuts having threaded engagement with one of said screws, whereby rotation of said screws in said nuts will change the elevation of said attachment frame relative to said axle.

2. For use in connection with a vehicle having a powered, rubber-tired, ground-engaging wheel, a snow traction attachment comprising:
   a. an attachment frame,
   b. an endless flexible traction belt carried on suitable belt pulleys rotatably mounted in said frame to form a generally horizontal loop,
   c. a pair of drive rollers carried rotatably in said frame for driving engagement with the outer surface of said belt each of said drive rollers comprising a central portion of a rigid material having relatively widely spaced external ribs extending parallel to its axis, and end portions formed of a relatively soft but rigid material formed to present relatively closely spaced gear teeth, sad central portion being frictionally engageable by said vehicle wheel, and wherein the outer surface of said traction belt is provided with transverse ribs spaced to mesh with the end portions of said drive rollers,
   d. attaching means operable to attach said attachment frame to the frame of said vehicle whereby said drive rollers and said belt are disposed beneath said vehicle wheel with the lower reach of said belt positioned to engage a snow surface beneath said wheel and extending forwardly and rearwardly in the direction of vehicle travel, and with said wheel having frictional driving engagement with said drive rollers but not the upper reach of said belt, whereby said vehicle wheel, acting through said drive rollers, turns said belt in the same rotary direction as said wheel to propel said vehicle over the snow, and
   e. means operable to adjust said attaching means to vary the elevation of said attachment frame relative to said vehicle, whereby said drive rollers may both be pressed against said vehicle wheel with optimum driving pressure, and also adapted to engage vehicle wheels of different diameters.

3. The structure as recited in claim 2 wherein said belt pulleys include a pair of pulleys directly supporting the lower reach of said belt and disposed respectively forwardly of the forward drive roller and rearwardly of the rear drive roller, the upper portions of said pulleys being disposed above the lower portions of said drive rollers, whereby said belt, in passing between either of said drive rollers and its associated pulley, is caused to wrap around and engage said drive roller to a substantial angular extent.

4. The structure as recited in claim 3 with the addition of a third belt pulley disposed forwardly of and at a higher elevation than the pulley disposed forwardly of the front drive roller, whereby the forward portion of the lower reach of said belt is caused to slope upwardly and forwardly relative to the lower reach thereof between said first-named pair of pulleys.

5. The structure as recited in claim 3 with the addition of a plurality of elongated skids carried rigidly by said attachment frame, said skids extending longitudinally of the lower reach of said belt and having sliding engagement with the upper surface thereof between said pair of belt pulleys, whereby to support said lower belt reach against upward deflection.

6. For use in connection with a vehicle having a powered ground-engaging wheel, a snow traction attachment comprising:
   a. an attachment frame,
   b. an endless flexible traction belt carried on suitable pulleys rotatably mounted in said frame to form a normally generally horizontal loop,
   c. a pair of drive rollers carried rotatably in said frame and having driving engagement with the upper reach of said belt,
   d. means operable to attach said attachment frame to the frame of said vehicle for pivotal movement about the axis of said vehicle wheel, whereby said drive rollers and said belt are disposed beneath said vehicle wheel with the lower reach of said belt positioned to engage a snow surface beneath said wheel and extending forwardly and rearwardly in the direction of vehicle travel, and with said wheel having driving engagement with said drive rollers but not with the upper reach of said belt, whereby said vehicle wheel, acting through said drive rollers, turns said belt in the same rotary direction as said wheel to propel said vehicle over the snow, the torque force exerted on said drive rollers by said vehicle wheel tending to pivot said attachment frame about the axis of said wheel, and
   e. means operable to secure said attachment frame against said pivotal movement in a direction to lower the forward end of the lower belt reach, but to permit opposite pivotal movement to raise the forward end of the lower belt reach.

7. The structure as recited in claim 6 wherein said securing means comprises one or more flexible but inextensible straps each secured at one end to said attachment frame forwardly of the pivotal axis of the frame, then extending forwardly and upwardly and secured at their opposite ends to a rigid portion of the frame of the vehicle.

8. The structure as recited in claim 7 wherein said securing means comprises a pair of said straps secured to said attachment frame in transversely spaced apart relation, at points spaced forwardly of the pivotal axis of said attachment frame, then extending forwardly in transversely crossed relation and secured at their opposite ends to a rigid portion of the frame of the vehicle, whereby they also stabilize the forward end of the attachment frame against lateral displacement.

9. For use in connection with a vehicle having a powered ground-engaging wheel, a snow traction attachment comprising:
   a. an attachment frame,
   b. an endless flexible traction belt carried on suitable pulleys rotatably mounted in said frame to form a normally generally horizontal loop,
   c. a pair of drive rollers carried rotatably in said frame and having driving engagement with the upper reach of said belt,
   d. means operable to attach said attachment frame to the frame of said vehicle for pivotal movement about the axis of said vehicle wheel, whereby said drive rollers and said belt are disposed beneath said vehicle wheel with the lower reach of said belt positioned to engage a snow surface beneath said wheel and extending forwardly and rearwardly in the direction of vehicle travel, and with said wheel having driving engagement with said drive rollers but not with the upper reach of said belt, whereby said vehicle wheel, acting through said drive rollers, turns said belt in the same rotary direction as said wheel to propel said vehicle over the snow, e. a pair of skis disposed respectively in outwardly spaced relation from the opposite sides of said attachment frame and extending parallel to the lower reach of the belt, f. means attaching each of said skis to said frame, and operable to maintain said ski parallel to the lower belt reach but permitting movement thereof both above and below the plane of the lower belt reach, and g. means independently biasing each of said skis resiliently downwrdly.

10. The structure as recited in claim 9 wherein each of said skis include a narrow blade extending longitudinally thereof and projecting downwardly from its lower surface.

11. The structure as recited in claim 9 wherein said means attaching each of said skis to said attachment frame comprises a pair of parallel, spaced apart links pivoted at their upper ends to said attachment frame and at their lower ends to said ski, and wherein said means biasing each of said skis downwardly comprises a spring loaded strut pivoted at its upper end to said attachment frame and at its lower end to said ski.

* * * * *